Dec. 28, 1954 G. E. SLEEPER, JR 2,698,355

COLOR TELEVISION SYNCHRONIZATION SYSTEM

Filed Aug. 3, 1949 4 Sheets-Sheet 1

| FIELD | | | | | | | |
|---|---|---|---|---|---|---|---|
| LINE | I | II | III | IV | V | VI | VII(I) |
| 1 | RED | | GREEN | | BLUE | | RED |
| 2 | | GREEN | | RED | | BLUE | |
| 3 | GREEN | | BLUE | | RED | | GREEN |
| 4 | | BLUE | | GREEN | | RED | |
| 5 | BLUE | | RED | | GREEN | | BLUE |
| 6 | | RED | | BLUE | | GREEN | |
| 7 | RED | | GREEN | | BLUE | | RED |
| | | | | | | | |
| 523 | RED | | GREEN | | BLUE | | RED |
| 524 | | GREEN | | RED | | BLUE | |
| 525 | GREEN | | BLUE | | RED | | GREEN |

INVENTOR.
GEORGE E. SLEEPER JR.
BY
Lippincott & Smith
ATTORNEYS

Dec. 28, 1954 G. E. SLEEPER, JR 2,698,355

COLOR TELEVISION SYNCHRONIZATION SYSTEM

Filed Aug. 3, 1949 4 Sheets-Sheet 2

INVENTOR.
GEORGE E. SLEEPER JR.
BY Lippincott & Smith.
ATTORNEYS

COLOR TELEVISION SYNCHRONIZATION SYSTEM

INVENTOR.
GEORGE E. SLEEPER JR.

BY

Lippincott & Smith
ATTORNEYS

Dec. 28, 1954 G. E. SLEEPER, JR 2,698,355

COLOR TELEVISION SYNCHRONIZATION SYSTEM

Filed Aug. 3, 1949 4 Sheets-Sheet 4

INVENTOR.
GEORGE E. SLEEPER JR.
BY Lippincott & Smith
ATTORNEYS

United States Patent Office 2,698,355
Patented Dec. 28, 1954

2,698,355

COLOR TELEVISION SYNCHRONIZATION SYSTEM

George E. Sleeper, Jr., Berkeley, Calif., assignor to Color Television, Inc., San Francisco, Calif., a corporation of California Application August 3, 1949, Serial No. 108,343

4 Claims. (Cl. 178—5.4)

This invention relates to multicolor television and is a modification of, and, in certain respects, an improvement on, my invention as set forth in the copending application, Serial No. 93,122, filed May 13, 1949, now Patent Number 2,653,182, on Multicolor Television.

The television system here contemplated is one wherein a plurality of images, each representing one color component of a polychrome picture, are formed side by side (preferably with a slight gap between the adjacent images) and a scanning beam is swept in continuous motion across all of the images. One of the advantages of the system is that it is compatible with black-and-white television transmissions, in the sense that the signals thus generated can be picked up by a standard type of black-and-white receiver and reproduced as an acceptable black-and-white image, in case there is no color television receiver available. Accordingly, the invention as hereinafter described in detail, will be set forth in the manner in which it is to be applied when used in connection with the currently adopted standards of black-and-white transmission; i. e., when used to produce pictures at a field frequency of 60 cycles per second and a frame frequency of 30 cycles per second, thus producing "odd-line interlace," and utilizing, further, the type of blanking and synchronizing pulses currently universally in use in televsiion transmissions in the United States, with only such minor modifications in the synchronizing pulses as are required to adapt them to color. It is to be understood, however, that the invention is not limited to this particular set of standards, but can be modified to conform to others should such standards later be adopted, in ways which will be readily appreciated by those skilled in the art.

If the type of scanning above referred to be applied to current standards without modification, each successive line of the combined image will be traced, in each field, in a different color, and each line will be traced in the same color in each successive scanning. When viewed from a little distance this gives the impression of a full-color picture, but some detail tends to be lost and therefore the picture is not considered to be entirely satisfactory. If the number of lines per frame be changed to an odd number which is not divisible by three, say to 523 or 527 lines for each two fields, the color in which each line is scanned will be changed in each successive scanning in a regular order, as, for example, line 1 being traced in red in the first scanning of the field, line 2 in red in the second, line 3 in the third, and so forth, or else in the reverse order, as, for example, line 3 in red in the first scanning, line 2 in the second, and line 1 in the third. The result of such an arrangement is that waves of color appear to progress either up or down the color field, producing "color crawl."

In my prior application above referred to I have shown that it is possible to obtain a color shift in successive retraversals of each line in the picture by shifting the phase of the horizontal or line scanning at the end of certain frames (a frame being defined as a complete complement of lines, both even and odd) irrespective of the number of lines per frame, and hence with the standard line arrangement. In that application I assumed that the color images were arranged in the order red, green, blue, considered from left to right, with the scanning beam traversing the images in that order, so that in the first field of the first frame line 1 would be traced in red, line 3 in green, line 5 in blue, and line 7 in red again, while the second frame would start with a blue line (as line No. 2), while the first line to be traced in red in this second field would be line No. 4. At the end of the second field which is substantially analogous to the beginning of the third field a shift is made in the phase of the horizontal scanning, so that instead of line 1 being retraced in red in field III it is traced in green. At the beginning of the fourth field the normal action of the odd-line interlace brings line No. 2, the first trace, into the red without the use of any phase changing procedure. A shift of phase is necessary, however, between fields IV and V to make the first line of the third field of the color cycle (that is field V of the pattern) blue, and another and final change of phase is required at the end of the sixth field to bring the first line of the seventh field back to red (the seventh field being a duplicate of the first field).

It will be seen that in the progression thus described the color lines progress successively upward in each succeeding scanning of both or either the even or the odd lines. Thus, in field I blue appears in line 5, in field III it occurs in line 3, and in field V in line 1. A similar situation occurs in the even-line fields, line 2 appearing in green in field II, line 4 in green in field IV, and line 6 in green in field VI (noting that for simplicity of explanation the fields are numbered in Roman numbering and lines are assigned Arabic numbering). In order to accomplish this one cycle of the horizontal scanning frequency is shortened by one-third at the end of each frame.

Experiment has proved that such a scanning pattern produces no color crawl. This is apparently because in each even-numbered frame a line of one color falls exactly half way between two lines of the same color in the succeeding frame, so that there is no continuous motion in one direction for the eye to follow. The detail of the picture is much improved over that observable where each numbered line appears always in the same color and very satisfactory color pictures have been produced by the method described in that application.

Experience has shown, however, that although color crawl does not appear in pictures thus transmitted and that black-and-white and color can be satisfactorily reproduced by it, the system does require exact adjustment both optically and electrically. Thus, if the various component images are not precisely alined so that the separation of the lines is not the same as between red and green or green and blue, so that there may be overlap between certain lines and spacing between certain others, the effect may be to produce fine dark lines transversely of the picture and these lines progress steadily across the field from bottom to top, thus giving a crawl effect which is not in color but in black-and-white. With exact adjustment this effect disappears, but since it results from maladjustment at the receiver and since receivers are not ordinarily operated by skilled technicians, it is an effect to be avoided if possible.

The objects of the present invention are, therefore, to provide color television pictures by a system of scanning which is completely compatible with black-and-white transmissions under present standards, or any standards which are likely to be adopted in the future; which are free of color crawl and with detail directly comparable with that obtainable in black-and-white transmission; which can be transmitted on a communication channel no wider than that required for black-and-white; and which also are receivable upon equipment which is not in perfect adjustment without the production of a white crawl or other effects militating against the acceptability of the final pictures produced.

As has been pointed out above, in the system described in the prior application there is a steady progression upward in successive frames of the lines representing any individual color component, and this is produced by shortening one horizontal scanning cycle by one-third at the end of each frame. If, instead of shortening one cycle, it be lengthened by one-third at the end of each frame, the color progression in each field will be downward from line to line in both the odd and even order fields. In accordance with the present invention the two types of progression are combined, being steadily downward in the fields of one order (odd or even) and up in the other (even or odd). To produce such an effect requires a somewhat more complex phase shifting system than that heretofore described; with a nominal 525-line frame it requires a shift of phase following two of the odd-order fields and two of the even-order fields, no shift being required following the remaining two fields of the six-field color cycle. Furthermore, the shifts following one of the odd-order fields and one of the even-order fields advance the phase of horizontal scanning by one-third of a cycle while the other two shifts retard it by one-third of a cycle, or, what is effectively the same thing, advance it by two successive thirds of a cycle. In accordance with the present invention this is accomplished by providing a counting mechanism which is triggered at the end of each field within the color cycle, as, preferably, by a ring counter. Each count which occurs at the end of a cycle whereafter a shift must take place triggers a secondary counter which counts out an appropriate number of intervals to effect the required shift and then generates a synchronizing pulse which resets the horizontal scanning and concurrently so modifies the transmitted synchronizing pulses as to bring receiving scanning systems into phase with the scanning camera generator.

Referring to the drawings.

Figure 4A:
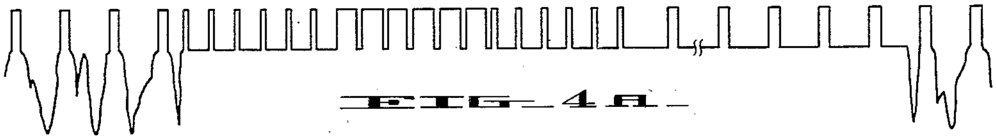
Figure 4B:
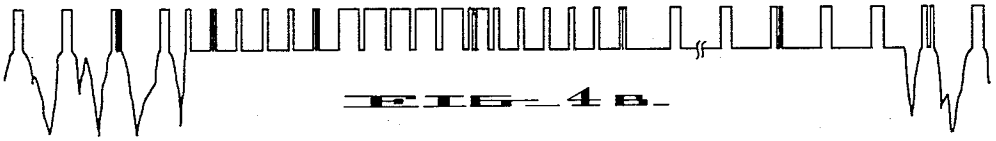
Figure 5:
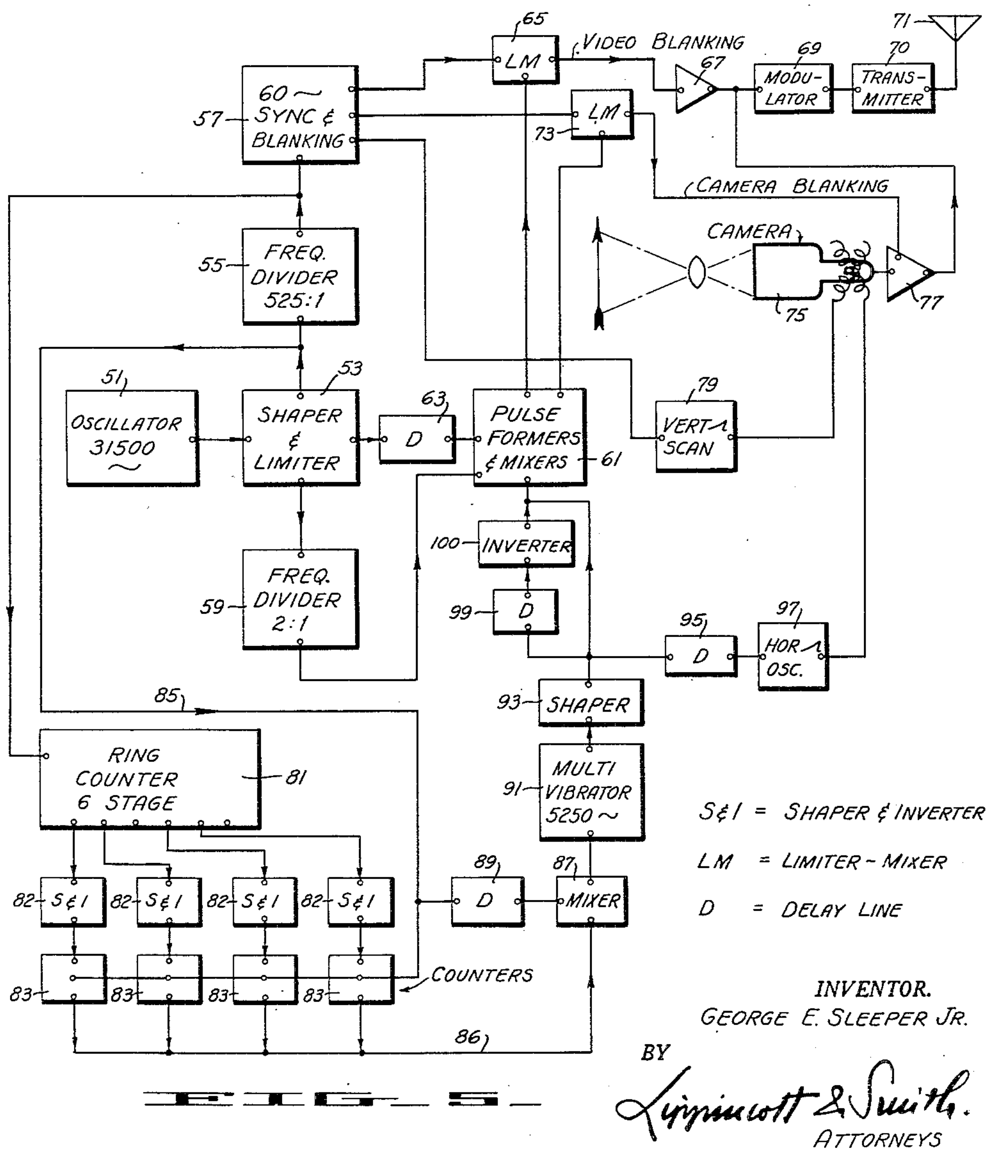
Figure 6:
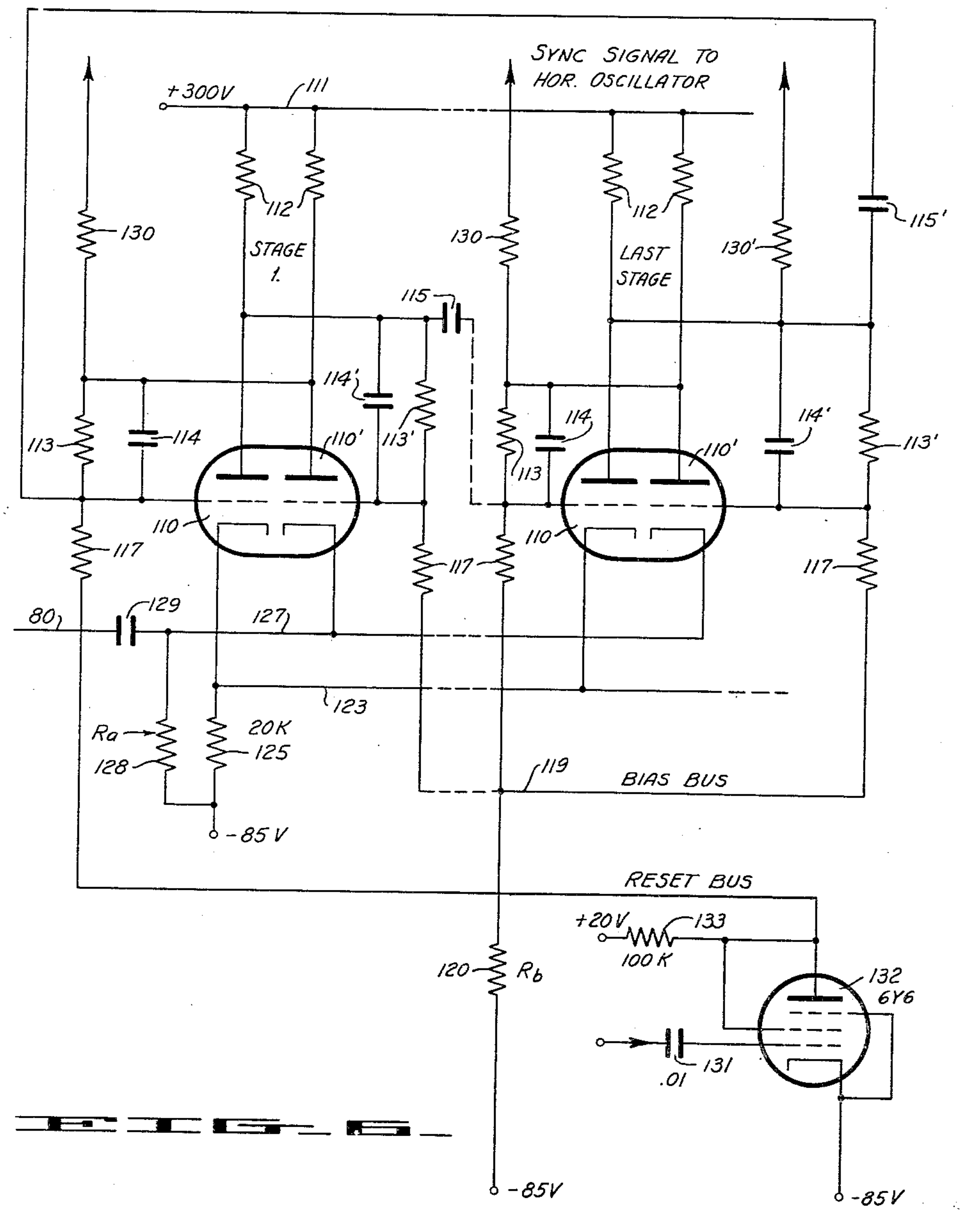

Figs. 4*a* and 4*b* represent, respectively, a synchronizing pulse as transmitted for black-and-white television in accordance with present standards, and a modified synchronizing pulse for color television in accordance with this invention which will produce the same effects as the standard pulse on present-day black-and-white receivers;

Fig. 5 is a block diagram of a synchronizing pulse generator with the modifications suitable for synchronizing the camera scanning and generating synchronizing pulses of the form illustrated in Fig. 3*b*; and Fig. 6 is a schematic diagram of a preferred form of counter circuit applicable to this invention.

In the detailed description of my invention which follows, two facts should be borne in mind; first, the method of this invention is of general applicability and can be employed, with minor modifications which will readily be appreciated, in a color television system employing any number of color components and with any type of interlace or any number of lines per frame; a second fact, however, is that transmission of less than three color components gives distorted and unsatisfactory color values, while the transmission of more than three color components either increases the wave band required for transmission of the entire picture, or degrades the detail, without giving a comparable increase in color value. It has been generally accepted that to make television valuable either in color or in black and white requires standardization in order that any picture, by whomsoever transmitted may be received by any receiver. For this reason the invention will be described as it applies to a three-color transmission system, using the primary additive colors red, green and blue. While I doubt that any change in such methods of transmission will occur, I am aware of the possibility that they may and I am also full aware that if they do, the same principles as are applied to the specific description herein given are fully applicable to such a changed system.

I recognize, moreover, that certain simplifications would be possible in the system as here described should it be used on channels devoted solely to color transmissions, and that it is fully applicable to use on such channels. I believe, however, that much difficulty in the transition from black-and-white to color can be avoided by transmitting color pictures in such manner that they may be picked up by black-and-white receivers, as black-and-white, without appreciable degradation in quality as compared with transmissions intended for black-and-white only. Therefore there has been chosen for detailed description an embodiment of the invention which will meet these requirements.

Figures 1, 2:
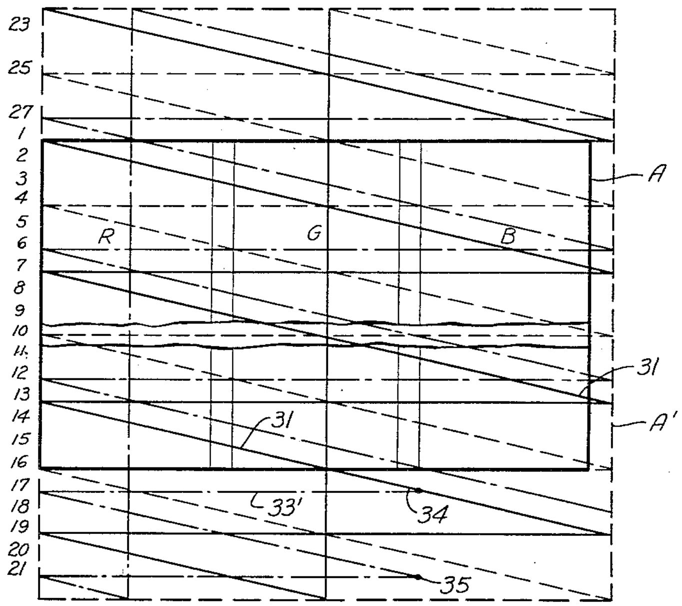
Fig. 1 is a diagram, drawn to greatly exaggerated and unequal scales in the vertical and horizontal dimensions, illustrating the path of the scanning beam in the first two fields scanned in accordance with a preferred embodiment of my invention, and illustrating the effect of the phase shift.
Fig. 2 is a chart illustrating the position of the lines carrying the different color components throughout one color cycle.

Referring now to Fig. 1 of the drawing, the heavy rectangle A represents a television field as actually scanned, and the smaller rectangles within the heavy rectangle, designated as R, G and B, represent the three color images of red, green and blue, respectively, which are comprised within this field. For the purposes of illustration, the dimensions are greatly distorted; actually, the widths of the respective color images would (in the absence of a special optical system) be four-thirds their height, and the width of the field would be greatly in excess of its total height.

The dotted rectangle A′, within which the rectangle A is included, represents the field which would be scanned were it possible to use ideal waveforms having zero fly-back time. Actually, the scanning line or portions thereof which appear outside the rectangle A never appears; they are either blanked out or pile up on the edges of the field. This method of showing is adopted so that simplified idealized waves of zero fly-back time may be used in the explanation which follows:

In the system here considered, a scanning beam is deflected across the three images in a pattern represented by the zig-zag 21st line. Again, for the sake of the showing, the slope of this line is greatly exaggerated, since only two and one-half lines are shown across the actual scanning area and four and one-half across the theoretical scanning area, whereas in fact 525 lines are used in tracing the latter. Mathematically, however, the shifts shown in the diagram would be in the same in the simplified case as they would be in the fields actually traced.

The frequency used for the vertical scanning is precisely the same as would be used in ordinary black-and-white television under current standards; i. e., 60 cycles per second. The frequency used for the horizontal scanning it, however, only one-third that used at present or 5,250 cycles per second for a 525-line picture.

In the complete picture the three color images are optically superposed, forming a single polychrome image. The three images are identical insofar as contour is concerned, differing, however, in their intensity in accordance with the color components they represent. Considering the three images as superposed, it will be seen that in scansion the first line is traced in red, the third line is traced in green and the fifth line in blue, whereafter, starting again with red, the sequence repeats. The final half-line within the area actually scanned in the first field is a half-line of green. The remaining odd lines, below the bottom of the visible field, are blanked out, but if they showed the sequence would be the same. The 23rd to 27th lines, inclusive, would actually be traced during the fly-back time or else would pile up at the top of the picture, but where they became visible they would enter the field to scan half the line in green, and continue to trace the first fully visible line (the second) in blue.

For the purpose of receiving such an image on black-and-white receivers, blanking and synchronizing pulses, of standard form, are transmitted in the spaces between the color images so that such receivers operating with a horizontal scanning frequency of 15,750 would continue to track.

So far, the system as described is similar to that set forth in my copending application above referred to. For the purposes of this invention, however, a different pattern is desired from that there described and this pattern is indicated in the chart of Fig. 2. This chart indicates how the first and last lines of each field would be traced, the column under field I showing the sequence red, green, blue, red, green, blue, etc., terminating with the last half-line in green as has been described in connection with field I. For the purposes of this invention, however, it is desired that second line, instead of being scanned in blue, be scanned in green. Successive lines in field II follow the same order as those in field I, except for the color with which the repetitive sequence starts so that a green and a blue line precede the first red line.

In order to accomplish this, the scanning line should enter the green field at the point 33 of Fig. 1, as does the dot-dash, zig-zag line 33′. This requires a shift of phase in the horizontal scanning frequency, and this shift of phase is accomplished during the time when the scanning beam is blanked out. This could be done either before or during the actual vertical fly-back time, but it is shown as being accomplished during the blanked lines below the fly-back immediately following the initiation of the blanking. I prefer to accomplish the rephasing as soon as possible after the beam has left the visible field, in order to give the scanning oscillators at the receivers as well as the transmitter time to "settle down" before the beam enters the visible field.

Change could be accomplished by lengthening one horizontal scanning cycle by one-third. This, however, is less certain than is the method which I prefer, which consists in shortening two successive horizontal scanning cycles by one-third each. The result is the same as far as the phase of the scanning wave when it enters the scanned area is concerned, but because scanning oscillators are customarily set so that in the absence of synchronizing pulses they will run at nearly the normal scanning frequency, they are likely to trigger themselves if an attempt is made to lengthen their cycles, whereas they can be retriggered before the end of the cycle, by a sufficiently strong pulse, quite easily and certainly. Accordingly, I prefer, when the last scanning line shown illustratively at 31 of the first field has left the field area and been blanked, to send a synchronizing pulse at approximately the point 34, bringing the beam back to the left-hand side of the area A' along the fly-back line 33'. Two-thirds of a cycle later, at the point 35, it is again recycled, so that, when vertical fly-back starts, it occurs at the center of the blanked out "red" image thereafter following the dot-dash lines designated as 33'' until it reenters the green field at point 33 as was desired.

A moment's consideration will show that a double-phase shift of the type that has just been described will always be necessary when the last line of a field which has just been scanned is of the same color component as the required first line in the succeeding field. This holds true whether the final line scanned in the preceding field is a complete line or only a half line which is completed as "line zero" of a succeeding even-numbered field, or if the last line of the preceding field is completed and the succeeding field to be scanned starts with the first line.

If the first line in the succeeding field is to be of a color component which precedes that of the field just completed in the sequence red, green, blue, red, only a single phase shift will be necessary; it will be seen that if the vertical fly-back occurred at the point 34 of Fig. 1, the first line to be scanned in the suceeding field would be red, which precedes green in the color sequence. If, however, the first line to be scanned in the succeeding field follows naturally on the color last scanned in the preceding field, as in the transition from a last line of green to a first line of blue, no rephasing at all is necessary. In accordance with this invention each of these conditions obtains twice in the color cycle, once following the end of an odd-order field and once following an even-order field.

Considering again the chart of Fig. 2, it will be noted that in field I green makes its first appearance as line 3, the second component scanned in the odd-order field, whereas in field III, green has moved up to line 1, and blue has moved up from line 5, the third scanned in the first odd-order field to line 3, the second line scanned in odd order. In the next odd-order field, field V, blue has moved up to line 1. Following the chart through, it will be seen that in each successive odd-order field each color component is displaced upward by one position in each successive scansion. Taking the even-order fields, the first complete line scanned, designated as line 2, is green. In the second even-order field, field IV, the first line scanned is red and the green components have been moved down to appear first in the second line scanned, designated as line 4. In the third even-order field, the first line scanned is blue, the red has been moved downward to second place, and green makes its first appearance in the third line scanned. The positions with the respective color components are therefore displaced successively upward in the fields of one order and downward in the other.

As far as the real essence of this invention is concerned, the order in which the color images are arranged within the area scanned is of no importance; any of the color components might occupy any position within the field. It is preferred, however, to put the green field in the central position because, in receivers which are in less than perfect adjustment, distortions in waveforms are more likely to occur at the beginning and end of a scanning line than they are in the central portion of the wave, and the eye being most sensitive to green, a better image will be secured and failure of registration will be less apparent with the green field in this position. Aside from this, it makes no difference how the images are arranged. The choice of the red image as the one across which scanning starts is purely arbitrary and the blue field could equally as well be on the right as on the left. Some convention had to be chosen, and the selection of red as the first field to be scanned has no more signficance than this.

Furthermore, as far as the appearance of the field is concerned, the same pattern can be obtained and the appearance of the field will be identical no matter which color is chosen for the first line of the second field. Neither does it make any difference in appearance as to whether the lines of the succeeding color components are displaced successively upward in the odd-order fields and downward in the even-order, as is here described, or downward in the odd fields and upward in the even. There is, however, a certain advantage in the order shown provided the color fields are arranged across the scanning area in the red-green-blue sequence. This advantage relates primarily, however, to the desirability of accomplishing the phase shift as soon as possible after the scanning beam has left the visible field; i. e., as soon as blanking starts.

As is explained in the prior application which has been cited, in order to make the color system compatible with standard black-and-white transmissions, the regular line synchronizing pulses used for black-and-white are sent out at the end of the scanning of each color image, that is, as the scanning line is traversing the gap between the red and green fields and between the green and blue, as well as at the end of the blue scanning. This will synchronize black-and-white receivers so that the lines resulting from a scanning of each of the color images will be superposed upon such receivers. Color receivers, however, are synchronized by sending out a unique pulse at the end of the entire scanning line, the unique pulse preferably differing from the intermediate pulses by being slotted. Since television receivers are designed to synchronize on the first rise of the synchronizing pulse, black-and-white receivers will respond to the rise of the unique pulse in precisely the same manner in which they respond to the unslotted pulses. The second rise, following the slot, occurs so soon after the receiver scanning oscillator has been tripped by the first rise that the slot has no effect. The color receivers are, however, designed to ignore any pulse which is not slotted, as has been shown in the prior case.

Figure 3:
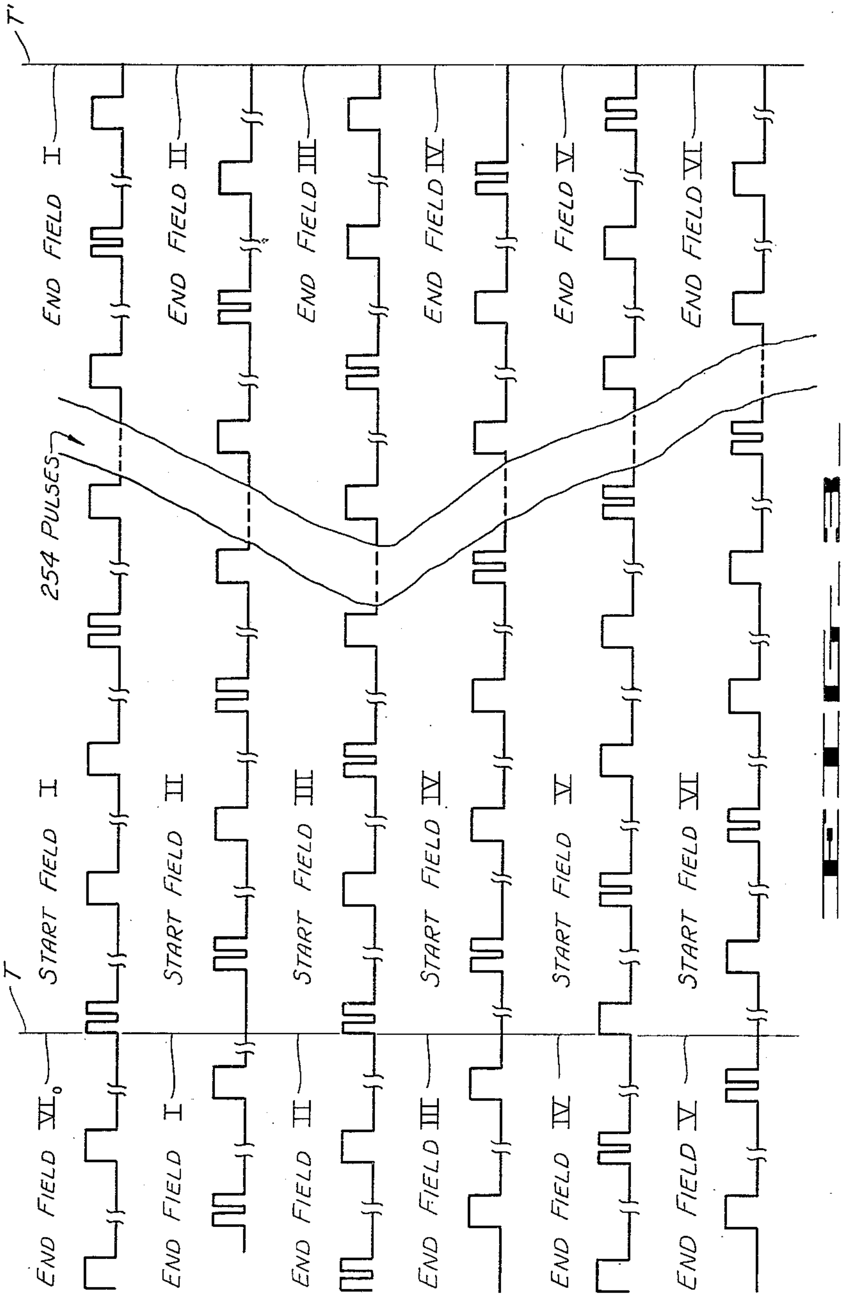
Fig. 3 is a simplified waveform diagram illustrating the position of the synchronizing pulses in the various fields of one complete color cycle.

Fig. 3 is drawn to show the arrangement of the slotted pulses in one complete color cycle. This figure is simplified in that it does not show the special form of equalizing pulses which are used at the start of each line, but treats all of the pulses as if they were identical. Fig. 4*b* shows the actual shape of the pulses for one field only, but due to the somewhat complicated form of the so-called equalizing and vertical synchronizing pulses, such a showing is harder to follow than is the simplified showing of Fig. 3.

As has already been mentioned, it is preferred to start the rephasing of the horizontal oscillator as soon as possible at the end of each field. In order to accomplish this the trigger pulse which initiates blanking in the transmitter is used as the signal which initiates the phase shift. In Fig. 3 this instant is indicated by the vertical lines T and T', T representing the trigger pulse at the beginning and T' the pulse at the end of the field. T', as it appears at the end of the first line in the figure, therefore indicates the same pulse as does T at the beginning of the second line.

Referring to the chart of Fig. 2, it will be seen that the last line traced in each color cycle is blue, while the first line traced is red. The sequence blue-red is the normal scanning sequence, and no phase change is required to accomplish it. Therefore, the two pulses shown as being the end of field "$6_0$" are unslotted, but the pulse which occurs at the end of the field is slotted. The line is then traced in normal order, with the two unslotted pulses following each slotted color-synchronizing pulse until the end of the field is reached.

As is shown in the discussion of Fig. 1, the last line traced in the first field is a green line, represented by an unslotted pulse immediately following a slotted one. This is shown at the end of line 1 in Fig. 3 and is repeated at the beginning of line 2. Only half of the green line at the end of field I is traced on this field; the other half is traced at the beginning of field II, and the first slotted pulse, representing the point 34 in Fig. 1, follows half a line after the trigger pulse T. One more unslotted pulse follows, and then a second slotted pulse occurs at the instant represented by the point 35 in Fig. 1. This completes the rephasing, and the pulses follow in the regular order of one slotted pulse followed by two unslotted ones, down to the end of the field.

At the end of field II again the last line to be traced is green, and the pulse initiated immediately before its being scanned is unslotted. Since field II ends with a complete line a slotted pulse follows immediately upon the trigger; it is followed by one unslotted pulse and then another slotted pulse, so that the third line traced in the third field will be in red. This corresponds to line 5 in the chart of Fig. 2, and completes the color shift for this field. The remainder of the pulses follow in regular order until the entire field has been scanned, ending with a blue line. This line is a half line, which is completed at the start of field IV, so that the first full line in field IV is red as it should be in accordance with the chart, and therefore no special synchronizing pulses are necessary.

Field IV ends with a red line so that field V would normally start with green. It is the second line in this field which starts with red, and hence the second pulse in this field is slotted. The shift has been fully accomplished by shortening only one cycle by one-third, and the remaining pulses of field V follow regular order, ending with a half line of red, which is completed at the start of field VI. Again, it is the second complete line in this field which starts with red, and hence the second pulse in the field is slotted.

Fig. 4*a* shows the present standard waveform used for vertical synchronization and blanking. The waveform shown is that used to initiate the odd-line frames, the waveform for the even lines differing only in that they start in the middle of a horizontal scanning line instead of at the end of a line and that the modified pulses terminate at the end of a cycle of the horizontal frequency instead of in the middle of a cycle. The waveform starts with the generation of the blanking pulse proper, this pulse being $$0.05V \pm \frac{0.03V}{0.00V}$$

long, where V is the time from the start of one field to the start of the next field, or 1/60 of a second. The synchronizing pulses are superposed on top of the blanking pulse, and consist, first, of a series of "equalizing pulses." The equalizing pulses comprise six short pulses, each 0.04H in length, where H is the time from the start of one line to the start of the next line and is thus 1/15750 second by present black-and-white standards. Since these pulses are separated by 0.05H the six pulses represent three black-and-white scanning lines or the equivalent of one line in the color system here described.

The equalizing pulses are followed by a series of six synchronizing pulses, the leading edges of which are spaced 0.5H apart, and the leading edge of the first synchronizing pulse similarly being spaced 0.5H from the leading edge of the last of the equalizing pulses. Under the present standards each of the synchronizing pulses is a maximum of 0.44H or a minimum of 0.42H long, and there being six pulses with their leading edges separated by one-half of the horizontal black-and-white scanning period, the six pulses again represent three black-and-white lines or one color line under the present system. Following the synchronizing pulses, six more equalizing pulses are transmitted at 0.5H intervals, whereafter the standard type of horizontal synchronizing pulses, separated by 1H, are resumed, continuing throughout the remainder of the blanking period and through the picture field.

Fig. 4*b* illustrates how the above pulse is modified at the start of field III. Reference to Fig. 3 will indicate that in this instance the first pulse following the blanking impulse should be a synchronizing pulse for the color field. Accordingly, the first equalizing pulse, instead of continuing for a period of 0.04H, is slotted after a period of 0.03H, the slot being 0.02H wide and being followed by a secondary short pulse which is also 0.02H wide. The second equalizing pulse represents the middle of a horizontal period and of course is unmodified. The third pulse, representing both the start of the line and an unmodified pulse in Fig. 3, is also left unmodified as is pulse 4. Equalizing pulse 5 is modified in the same manner as is the first pulse. Since the two phase shifts accomplished by equalizing pulse numbers 1 and 5 complete the rephasing operation, no further modifications are introduced in either the one remaining equalizing pulse or the first four synchronizing pulses. The sixth of the synchronizing pulses is slotted by a 0.02H slot introduced at 0.03H after its initial rise. The succeeding five pulses, i. e., the remaining synchronizing pulse and the first four of the second series of equalizing pulses, are unmodified, the fourth equalizing pulse being slotted and lengthened in the same manner as the first of the first series. At a time equal to 3H later, the first slot is introduced into one of the normal horizontal synchronizing pulses. These pulses are normally 0.08H in length, and every third one is centrally slotted for the purpose of color synchronization by a slot 0.02H wide.

The pulses occurring at the ends of the other fields of the other fields of the color cycle are similarly treated. Where a color synchronizing pulse occurs at the period of an equalizing pulse the latter is shortened and followed by a 0.02H secondary pulse. The vertical synchronizing pulses are slotted by a 0.02H slot, 0.03H after their initial rise, without being correspondingly lengthened at the end of the pulses, and the same is true of the normal horizontal synchronizing pulses.

Several synchronizing pulse generators have been developed for producing the standard form of synchronizing pulse. One such generator is shown in the patent to A. V. Bedford, No. 2,258,943. Another form of sync signal generator is shown in RCA Laboratories Division Report LB678, distributed to licensees of said company. Still other forms have been or can be devised. All such generators operate on the general principle of separately developing the pulses of different types, shaping these pulses, clipping them to delete unwanted portions, adding, and finally reclipping them before introducing them to the mixer and modulator which feeds them into the television transmitter combined with the video signals of the picture. The method which I prefer to use for generating these unique forms of synchronizing pulses required for this invention is shown with particular reference to the Bedford type of synchronizing signal generator, but it is equally applicable to others.

In Fig. 5 the primary timing is provided by a master oscillator 51 operating at double the black-and-white line frequency, or at 31,500 cycles for a 525-line picture in accordance with current standards. The output waves of the oscillator are fed to a shaper and limiter 53 which converts the sine waves into short pulses occurring at the 31,500-cycle frequency. These pulses are fed into a series of frequency dividers with a total stepdown frequency ratio of 525:1, and the resulting 60-cycle pulses are fed to a 60-cycle blanking pulse generator 57. All of this is standard and is in accordance with the more detailed disclosure of the Bedford patent.

The 31,500-cycle pulses from the shaper and limiter 53 are also fed to a 2:1 frequency divider 59, which sends pulses at the standard black-and-white line frequency to a series of pulse formers and mixers 61. The pulse formers are also supplied with input signals through delay lines 63 by the 31,500-cycle pulses from the shaper and limiter, and are there combined with the line-frequency pulses from the divider 59 in such manner as to form the standard pulse which has been described. The outputs from the pulse formers and mixers are fed to a limiter and mixer 65 for combination with the blanking pulse and are thence fed to the line amplifiers 67 and so to the modulator 69 and a radio transmitter 70 to be radiated by an antenna 71 or otherwise transmitted.

A second output from the pulse formers and mixers 61 feeds a limiter and mixer 73 and transmits the necessary blanking pulses to the pickup camera 75 to be mixed with the output of the latter in the line amplifier 77 before the signals from the latter are fed to the modulator 69. Fnally, synchronizing pulses from the synchronizing and blanking generator 57 are fed to a vertical scanning generator 79 which generates the 60-cycle sawtooth deflecting wave in the pickup tube.

All that has been described thus far is well known in the art and is discussed in much greater detail in the Bedford patent.

In accordance with this invention there is added an additional output from the frequency dividers 55 which feeds a six-stage ring counter 81. Various types of ring counters are known in the art; the form preferred here comprises six bi-stable multivibrators, each comprising a pair of triode or tentode elements, only one of which can carry current at any one time. Various counters of this type are known, and it is therefore probably unnecessary to describe such in detail. Fig. 6, however, shows one form which may be employed not only for the present purpose but also for secondary counters later to be described and is therefore included for the sake of completeness. In the figure two stages only of such a counter are shown, these stages being shown as interconnected by dotted lines indicating any desired number of stages interposed and connected in precisely the same manner as those which are actually shown.

Each stage comprises a dual tube consisting of two units or sets of elements 110 and 110'. The anodes of each of the triode units are connected to a positive bus 111 through resistors 112 which may be of the order of 45,000 ohms each. The plate of each unit is cross-connected to the grid of the other unit of the pair through a resistor 113, 113', of the same order of magnitude as resistors 112, and a speed-up condenser 114, 114'. The plate of each unit 110 is also connected through a condenser 115 to the grid of the unit 110 in the succeeding stage. Each condenser 115 may have a capacity of about 50 micromicrofarads, or about double that of the speed-up condensers 114, 114'. To complete the ring the plate of the unit 110 of the last stage is similarly connected back to the grid of the corresponding element in the first stage through a condenser 115' of the same value as condensers 115.

All of the elements are biased through resistors 117, which may be of the values already mentioned, i. e., approximately 45,000 ohms. In the case of the ring counter 81, all of the grids may lead to a bias bus 119 which connects through a resistor 120 of approximately 1,000 ohms to a −85 volt bias source, unless it be desired that the color cycle should always start at the same point, which is ordinarily unnecessary. If this should be desired, or, in the case of the secondary counters later to be described, the tubes in the counter which are to be conducting at the beginning of the cycle are biased to a reset bus 121.

The cathodes of all of the elements 110 connect to a bus 123 and thence through a resistor 125 of approximately 20,000 ohms to the 85-volt negative source. The cathodes of the elements 110' connect to a common bus 127 which is also connected to the 85-volt negative source through a resistor 128, the value of which is dependent upon the number of stages in the counter; in a single stage counter, which counts only either zero or one, the resistor 128 would be of approximately the same value as the resistor 125, but if $n$ stages are used its value should be approximately $$\frac{20,000}{n}$$

Negative triggering pulses from the frequency divider 55 are fed to the counter through the line 80 which connects, via a condenser 129, with the bus 127 and the cathodes of the elements 110'.

It will be seen that each stage of this counter constitutes a more or less conventional bi-stable multivibrator, and only one of the sets of triode elements in each stage can be turned on, i. e., carrying current, at one time, since the fact that one is on biases the other to cutoff. Moreover, the high value of the resistor 125 insures that unit 110 of one stage only can carry current at any instant, since the current from two tubes through this resistor would bias the cathode so far positive that one would be cut off. For this reason, in between pulses, while the unit 110 of one stage and one stage only is carrying current, the twin unit 110' of this stage is cut off, but the units 110' of all other stages are in the conducting state with their grids biased positively through the voltage divider circuits comprising the resistors 112, 113' and 117 in series.

The single unit 110' which is not conducting has its grid biased negatively because of the drop in the plate resistor of its corresponding unit 110, it being this negative bias which holds the tube below cutoff. A strong negative pulse coming in through the line 127 drops the potential of the cathode of the unit 110' to a point where this cutoff bias is no longer effective, and once it has started to carry current regenerative action takes place which immediately carries it to saturation, at the same time driving the grid of its twin unit 110 negative and causing it to cut off. The pulse coming in on the bus 127 has no effect on the units 110' which are already conducting, since they are carrying current up to saturation. The cutoff of the tube 110 of the stage which is activated transmits a positive pulse through the condenser 115 to the grid of the unit 110 of the succeeding stage, causing this tube to carry current and to cut off the tube 110' of this next stage, and thus setting it so that it will respond to the next pulse delivered through the bus 127. The device therefore "counts around" as long as these pulses continue to be supplied. The pulses supplied to the succeeding stages in a counter of this character are referred to as the "dynamic output" of the stages. The so-called static output is delivered from the plates of the various tubes as they are turned off, through resistors 130.

In the case of the ring counter 81 static outputs are taken from stages 1, 2, 4 and 5, corresponding to the ends of the like-numbered fields in the color cycle. Each static output pulse is a rectangular wave 1/60 of a second long. These waves are fed to differentiators and pulse shapers, are inverted, and are passed on to a group of secondary counters 83. The secondary counters 83 are similar to the ring counter 81 with the exception that they are of varying numbers of stages and that in each case the ring is broken; i e., the trip circuit from the last stage back to the first including the coupling condenser 115' is omitted so that when they have counted their allotted number of pulses all of the units 110' are conducting and all of the units 110 nonconducting, and they can pass no pulses until they are reset.

The resetting is accomplished by means of the pulses derived from the pulse shapers 82 which are supplied through a condenser 131 to the grid of a tube 132, preferably a tube of the beam-power type. The cathode of this tube is connected to the −85 volt bus. The screen grid and plate are connected together, and, through a resistor 133 of about 1/10 megohm to a +20 volt lead. The reset bus 121 is connected to this plate. In the secondary counters the grid of unit 110 of the first stage connects to this reset bus. The pulse from the ring counter 81 is inverted and amplified by tube 132 and places a positive bias on the grid of tube 110 of the first stage, flipping it and setting it. As it is reset there will, of course, be developed a positive pulse in the static output 130 of this first stage; in certain of the stages of certain of the counters this pulse is used, as will later be described, but in other cases the static pulse is only used from the last stage.

The pulses counted by the secondary counters are 31,500 cycle pulses derived from the shaper and limiter 53 through lead 85, and, like those counted by the ring counter, are applied to the cathodes of the units 110' through the lead 127. The counts come at half-line intervals, and the first secondary counter, which is activated by the pulse coming at the end of the last line of the first field, is a counter of five stages with static output take-offs from the plate of unit 110' of the second stage (which is the same as the plate of unit 110 of the first stage) and also from the plate of unit 110 of the last or fifth stage. The secondary counter which is activated by the ring counter at the end of field II is a four-stage counter, with static take-offs connected to the plate of unit 110' of the first stage and of unit 110 of the fourth stage. No secondary counter is activated by the ring counter at the end of field III, since no phase shift occurs at this point. At the end of field V a two-stage counter is used with a static output take-off from the plate of unit 110 of the final stage. At the end of field V a three-stage counter takes off from unit 110 of the third stage. No counter is used at the end of stage 6.

The take-offs from all of the secondary counters feed into a bus 86 and thence into a mixer 87, wherein they are combined with 31,500 cycle pulses which are taken from the line 85 and delayed as requisite in a delay line 89 to bring them in to step with the output pulses from the counters 83.

The combined pulses from the mixer 87 are fed to an astable multivibrator 91 which is designed to operate normally at a frequency very slightly less than 5,250 cycles per second, the color line frequency preferably one having a relatively very short time-constant for timing one unit and a a much longer time constant for the other, so that when "flipped" it almost immediately "flops" back, thus generating a very short pulse of 1.26 microseconds, or .02H, followed by a period of slightly over 63 microseconds (1H) in its second quasi-stable state before it again flips of itself. As is well known, such a multivibrator will stablilize on subharmonic of a frequency injected into its circuits, in the present case the 31,500 cycle pulses from the shaper 53. During the greater portion of the time these pulses are the only ones injected into the multivibrator circuit, and it accordingly stabilizes at one-sixth of the frequency fed to it, i. e., at the 5,250 cycle frequency for which it is primarily designed. At the start of each of four of the frames in the color cycle, however, extra large synchronizing pulses are injected into the multivibrator circuit due to the combination of the pulses from the counters 83 and the pulses from the shaper 53, and by proper adjustment these pulses can be caused to trip the multivibrator at the times that they arrive which will in each case be at the instant when the mulitivibrator has completed two-thirds of its normal cycle. A device of this kind, once tripped, "forgets" what has happened to it in the past, and it therefore immediately resynchronizes at the 6:1 stepdown ratio on the pulses fed through the delay circuit 89.

The rectangular pulses from the multivibrator 91 are passed through a shaper 93. This can usually be merely a clipper for reducing them to the proper amplitude but if a longer "flip" period is given the multivibrator further differentiation and shaping can be restored to to convert them into unidirectional pulses having a duration of .02H. These pulses are fed through a delay line 95 to trigger the horizontal scanning oscillator 97 which supplies the deflecting field for the camera tube 75. Since the figure is a single line block diagram the coils are simply shown schematically, without return circuits. They are likewise fed to the pulse formers and mixers 61 where they are combined subtractively with the simultaneously generated equalizing, vertical-synchronizing, or horizontal-synchronizing pulses of the standard synchronizing signal. They are also fed through a delay line 99 and an inverter 100. The delay line delays the pulses by an interval of .04H. The inverter reverses the polarity of the delayed pulses. The delay circuit 89 is adjusted so that the leading edges of the unreversed pulses arrive at the combining circuit 0.03H, after the leading edge of the equalizing or synchronizing pulse with which it is to be combined. If it be an equalizing pulse the combination "shaves off" the trailing edge of such pulse, and the inverted pulse, delayed by the line 99, provides the short following pulse as shown in the waveform of Fig. 4*b*. In the case of either the vertical or horizontal synchronizing pulses, the inverted pulse performs no useful function, but it is removed in the final clipping which is provided by the limiter-mixers 65 and 73.

It has already been indicated that the pattern of Fig. 2 is slightly preferable as compared with the five variants thereof which will give the same optical effect, the reason for the preference being that it permits the earliest synchronization of the horizontal scanning oscillator. It obviously would be possible to rephase the multivibrator 91 by means of a synchronizing pulse arriving only one-third of its cycle after it had last "flipped," provided the synchronizing pulse were powerful enough. The same would hold true of the various types of circuits used in receivers. For certainty of operation, however, it is much better to rephase it at the two-third cycle point, and this is therefore taken as an important although not as essential feature of the invention. In any circuit built with a reasonable degree of economy the first pulse which can be satisfactorily used as a trigger for the counting circuits is the blanking pulse trigger. Since the final lines rotate in color in both the even- and odd-order fields, the trigger pulse will therefore occur either in the middle or at the end of a line of each color in succession. If it is a blue line which has just been traced or is being traced at the time the trigger pulse T occurs, there must be a wait of two-thirds of a cycle or four counts before the first rephasing pulse can be transmitted. If the change is to be from blue to blue, a second pulse must be sent four counts or two-thirds of a cycle later, resulting in a minimum number of counts of eight to change from blue to blue at the end of an even-order field, or of nine to change from blue to blue at the end of an odd-order field.

A change from red to red, i. e., from red as the last line of one field to red as the first line of the succeeding field, requires six or seven counts, according as the change is made following an even or odd order field, whereas a change from green to green requires either four or five counts in accordance with the change being made from even or odd order. In the type of pattern here considered two changes must be made from a last line of some color to a first line of the same color, and the pattern shown is the only one in which this change is, in both cases, from green to green, thus giving the minimum number of counts, completing the change at the earliest possible phase of the operation, and, incidentally, using a minimum number of counting tubes.

It should again be emphasized that although the invention has been described in terms of three color components arranged in a specific order, that is merely illustrative, and the method is preferably general. Considering the case of the three color components only, they may be designated as A. B and C, and these may represent any colors which additively produce white arranged in any order. If more components are used or if three are used plus a black-and-white key image, such components may be described as A, B, . . . *n*, and again, any of the letters in the series may represent any of the colors used as long as they appear in successive rasters wherein the color components of one are successively displaced upward in the series while those in the other are successively displaced donwward in the successive scanning operations. Once present-day standards are departed from, the possible scanning rasters become too numerous to be profitably considered but since future developments may lead to arrangements not now contemplated, the fact that the invention is applicable to such developments must be kept in mind.

The type of wave proposed herein is one which has been found satisfactory, but it is to be understood that rather than to be regarded as essentially limiting in nature, the precise type of signal wave suggested is to be considered largely illustrative of the principle. The particularly significant and characterizing feature is that at some point in the apparatus to form the wave provision is made for generating or producing a unique form of color phase control pulse which will indicate to the color television receiver one particular color of the selected sequence but which will be ineffective in the black-and-white receiver insofar as disturbing its normal operating conditions is concerned. Likewise, with respect to equalizing pulses, the significant feature is that the control signal may be combined therewith without any detrimental effect on the signal as a whole. If it be desired in some instances to retain the equalizing pulse exactly in its standardized form, then a pulse signal of generally rectangular shape can be caused to follow the selected equalizing pulse or pulses after a spacing of a selected time period. Should this plan of transmission be followed then naturally the slot in the line synchronizing pulse and the slot in the vertical synchronizing pulse will occur at a time period coinciding, as it were, with the termination of the vertical sync pulse. The difference in delay can be compensated at the receiver. Other modifications, of course, may be made also within the concept of this invention and without departing from the principle herein set forth.

The particular modification shown of the standard black-and-white synchronizing pulses is only one of several that are possible to attain the same result, and while at present it appears the most desirable, field tests in marginal areas may prove otherwise. One possible system involves suppressing the color synchronizing pulses entirely during the first equalizing and vertical synchronizing pulses, starting the rephasing at the second equalizing pulses and letting the horizontal oscillators of color receivers run free for two lines. Another modification would be to suppress the color synchronizing pulses for three cycles, starting the color rephasing with the resumption of the standard line synchronizing pulses. All such variants are deemed to be within the scope of this invention.

Furthermore, counters of the energy-storage type can obviously be used instead of the multivibrator types here described by the simple expedient of using the pulses from the ring counter as gates instead of as resets. Such modifications are contemplated as within the scope of the invention, and protection is therefore desired as broadly as possible within the scope of the following claims.

I claim:

1. Apparatus for color television operative to transmit an integral number of different color fields within a selected repetitive color cycle comprising means for generating electric waves repeating at a first selected frequency, means for generating electric waves at a frequency which is a subharmonic of the generated frequency and which frequency represents a desired line scanning frequency, means for stabilizing the generated line frequency waves by the generated electric waves of the multiple frequency, means for generating electric waves repeating at a selected field frequency which is a subharmonic of the first generated electric wave, means for controlling the field frequency in an interlocked relationship with the first generated frequency, means for differentiating between cycles of field frequency occurring in different order within the selected repetitive color cycle, and means operating at the end of selected scanning fields for shifting the cycles of said multiple frequency on which the line frequency generator stabilizes.

2. Apparatus for color television operative to transmit an integral number of different color fields within a selected repetitive color cycle comprising means for generating electric waves repeating at a first stabilized frequency, means for generating electric waves at a frequency which is a subharmonic of the first generated frequency to provide waves of scanning line frequency, means for stabilizing the waves repeating at line frequency by the stabilized frequency waves, means for generating electric waves at a field frequency also constituting a subharmonic of the first stabilized frequency generated wave, means to interlock the generating means for the field frequency with the first frequency thereby to control the field frequency generated, means for differentiating between cycles of field frequency occurring in different order within the selected repetitive color cycle, and means operating at the end of selected scanning fields for shifting the cycles of said multiple frequency on which the line frequency generator stabilizes.

3. In color television synchronizing and scanning apparatus including a generator of field-frequency pulses and a generator of line-frequency pulses, a generator operating at an even harmonic of said line-generator frequency connected to stabilize said line-frequency generator, counting means actuated by said field-frequency pulses for selecting certain of said pulses within a color cycle, means responsive to the counting means for counting different numbers of cycles of said harmonic frequency following the selected pulses of different order within said color cycle, and means responsive to the means for counting cycles of harmonic frequency for injecting into said line-frequency generator phase-shifting pulses at the conclusion of the number of harmonic frequency cycles counted.

4. In color television scanning and synchronizing apparatus including a generator of field-frequency signals and a generator of line-frequency signals, a ring counter actuated by said field-frequency signals to count around in a color cycle, a generator interlocked with the generator of field frequency signals operating at an even harmonic of said line frequency, and counting means activated by selected stages of said ring counter to count predetermined numbers of cycles of said harmonic frequency and connected to inject into said line-frequency generator triggering pulses for rephasing said line-frequency generator at the end of the number of harmonic frequency cycles counted.

References Cited in the file of this patent

UNITED STATES PATENTS

| Number | Name | Date |
|---|---|---|
| 1,779,261 | Morehouse | Oct. 21, 1930 |
| 2,301,521 | Cawein | Nov. 10, 1942 |
| 2,479,517 | Schensted | Aug. 16, 1949 |
| 2,521,010 | Homrighous | Sept. 5, 1950 |
| 2,531,544 | Wendt | Nov. 28, 1950 |

FOREIGN PATENTS

| Number | Country | Date |
|---|---|---|
| 231,805 | Switzerland | July 17, 1944 |
| 562,334 | Great Britain | Oct. 6, 1943 |

OTHER REFERENCES

Fernsch, Band 1, Heft 4, August 1939, pages 171–179.